Aug. 4, 1942.                G. A. ISING                 2,291,628
APPARATUS FOR RELATIVE GRAVITY MEASUREMENTS
Filed Feb. 23, 1938

Inventor:
Gustaf A. Ising
By: Glascock Downing & Seebold
Attys.

Patented Aug. 4, 1942

2,291,628

UNITED STATES PATENT OFFICE 2,291,628

APPARATUS FOR RELATIVE GRAVITY MEASUREMENTS

Gustaf Adolf Ising, Djursholm, Sweden

Application February 23, 1938, Serial No. 192,154
In Sweden February 24, 1937

1 Claim. (Cl. 265—1.4)

The present invention relates to apparatus for measuring gravity.

The usual method for relative measurements of gravity is based on the use of an ordinary invariable pendulum, the period of swing of which is measured at different stations with as high accuracy as possible. In modern times, however, the pretensions of accuracy have become very high, especially when exploring a small district for prospecting purposes, for instance when searching for mineral or oil deposits, so that the usual method requires a complicated, heavy and expensive apparatus and rather long time of observation. Therefore, other methods have been employed which either do not require any time-observations at all or require only observations of moderate accuracy. In these prior methods a force proportional to the gravity acceleration and due to the weight of a certain movable mass is compared with another force independent of the gravity acceleration and as a rule of elastic origin derived from a spring or an enclosed gas volume.

With these known methods two difficulties arise in connection with the elastic force, namely its variation with the temperature and the so-called elastic after-working.

An object of the present invention is to reduce materially both the difficulties mentioned, by choosing for the force of comparison an electrostatic attraction or repulsion from at least one charged conductor which is insulated and conveniently placed in an evacuated vessel together with the movable mass. The electrostatic force is completely free from after-working and its dependency upon the temperature will be comparatively small, when the force originates from insulated electric charges, as this dependency is only indirectly provoked by the heat-dilatation of the bodies. By conveniently choosing the material and arrangement of the conductors and insulators, the effect of this heat dilatation may be compensated or at least rendered very small. The evacuation reduces the conductivity of the gas, so that the charge on the insulated conductor and thereby force of comparison will be kept very nearly constant during a long time.

In carrying out the invention an instrument may be used which is based on the same principle as an electroscope. Before commencing the gravity-measurements at least one of the conductors of the instrument is charged and then insulated. The instrument is then transported, while keeping its charge unchanged, to the different observation stations where its indications are observed.

The invention will be more apparent upon a consideration of the following detailed description and the accompanying drawing in which two different embodiments are illustrated schematically.

Figure 1:
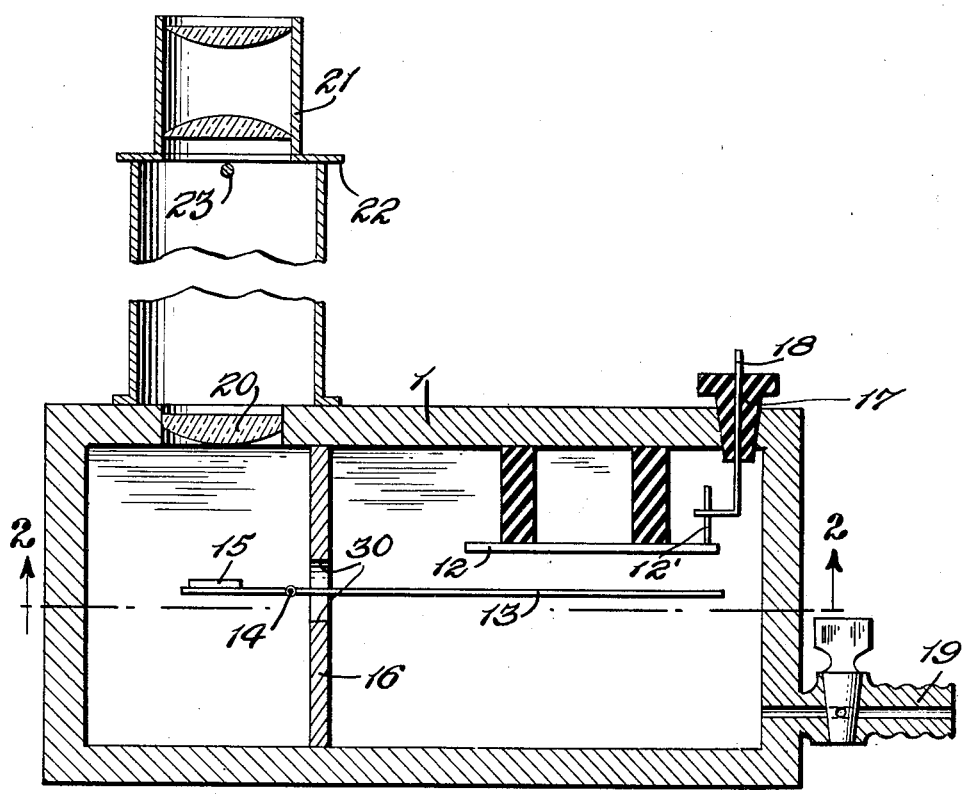
Figure 1 is a vertical section of one embodiment.
Figure 2:
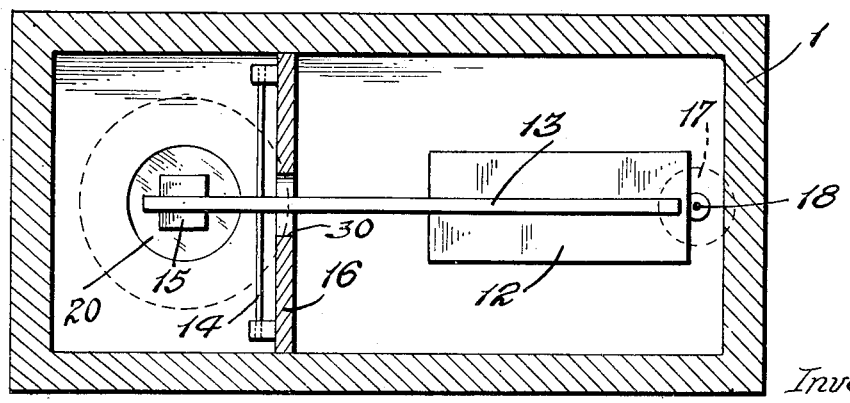
Figure 2 is a section on line 2—2 in Figure 1.

With particular reference to Figure 1 there is provided an evacuated vessel 1. The vessel 1 contains an insulated metal plate 12 which is the conductor to be charged. The charged plate 12 attracts a pointer 13 which is able to turn about a horizontal axis 14, such as a stretched horizontal torsional wire, and carries a mirror 15. A screen 16 provided with a central slit delimits the electric field and also, by means of the edges 30 of said slit, provides stops for preventing too great deviations of the pointer 13 from horizontal position. The pointer 13 is, through the conducting wire 14, electrically connected with the casing 1 and may, during the transports of the instrument, be kept arrested by means of some known clamping device.

For the purpose of charging of the plate 12 a stopper 17 of insulating material is arranged in a corresponding opening in the wall of the casing, said stopper carrying a bent metal rod 18 which, by turning the stopper, may be brought into contact with an extension 12' of the plate 12. The vessel 1 is evacuated through a stop cock 19. The optical viewing system consists of a vertical telescope in which 20 is the objective lens, 21 an eyepiece, 22 a scale and 23 a crosswire. The scale and the crosswire are approximately in the focal plane of the objective, the scale conveniently being placed a little sideway from the optical axis or raised from the focal plane in Fig. 1 so that only its image in the mirror 15 is visible through the eyepiece, while the crosswire 23 is directly viewed through the eyepiece.

In operation of the apparatus and when the device is in one position or at a base station the plate 12 is charged momentarily by connecting the plate through the rod 18 to one terminal of a potential source such as a battery (not shown). The other terminal of the source is adapted to be connected to the casing 1. After disconnecting the plate 12 from the potential source the position of the pointer 13 is observed by noting the position of the mirror 15 through the telescope. The instrument in such a charged condition may then be transported to some other point or station where the gravity may be assumed to be greater than at the first point or station of measurement. The pointer 13 will then assume a different position which will provide an indication in the difference of gravity.

While the invention has been described with reference to specific structural details it will be appreciated that changes may be made without departing from the spirit and scope of the invention as set forth in the appended claim.

I claim:

A static gravimeter comprising in combination, a conductive pendulum suspended in such manner as to be able to turn about a horizontal axis, stops restricting the movement of said pendulum to small deflections from a horizontal position, optical means for observing the displacements of the pendulum, a stationary conductor disposed near said pendulum, an evacuated receptacle hermetically enclosing said conductors, means highly insulating one of said conductors so as to enable it to retain a substantially invariable electrostatic charge the electrostatic field of which constitutes substantially the whole compensating force counter-balancing the weight of the pendulum so that successive observations at different places may be carried out without recharging.

GUSTAF ADOLF ISING.